US006889188B2

(12) United States Patent
Metzler et al.

(10) Patent No.: US 6,889,188 B2
(45) Date of Patent: May 3, 2005

(54) METHODS AND APPARATUS FOR CONTROLLING AN ELECTRONIC DEVICE

(75) Inventors: Benjamin T. Metzler, Beaverton, OR (US); Wayne D. Trantow, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 333 days.

(21) Appl. No.: 10/302,446

(22) Filed: Nov. 22, 2002

(65) Prior Publication Data

US 2004/0102977 A1 May 27, 2004

(51) Int. Cl.[7] .................................................. G10L 15/00
(52) U.S. Cl. ........................................ 704/270; 704/275
(58) Field of Search ................................ 704/270–278; 434/307 R; 375/240.01

(56) References Cited

U.S. PATENT DOCUMENTS 5,733,131 A * 3/1998 Park ........................ 434/307 R
5,758,323 A * 5/1998 Case ........................... 704/278
2001/0024469 A1 * 9/2001 Keren et al. ........... 375/240.01

* cited by examiner

*Primary Examiner*—David D. Knepper
(74) *Attorney, Agent, or Firm*—Grossman & Flight, LLC

(57) ABSTRACT

Methods and apparatus for controlling an electronic device connected to a network are provided. The methods and apparatus described herein convert a text based device list and/or a text based function list into text based voice prompt scripts. The voice prompt scripts are then read to a user via a text-to-speech engine. The user responds with a voice command for a device. The voice command is converted to text by a voice recognition engine. This text is then used to send a command to the electronic device via the network.

30 Claims, 5 Drawing Sheets

METHODS AND APPARATUS FOR CONTROLLING AN ELECTRONIC DEVICE

TECHNICAL FIELD

The present disclosure relates in general to computer systems and, in particular, to methods and apparatus for controlling an electronic device.

BACKGROUND

Designers of electronic devices, such as consumer electronic devices, use many different user interface mechanisms in an effort to increase ease of use. For example, a stereo may include a circular knob or an up/down rocker switch for volume adjustment. Occasionally, designers of electronic devices include a voice recognition capability (e.g., "dial phone")

This voice recognition capability must be integrated into each device at the time the device is designed and manufactured. In order to add voice recognition capabilities, each device must include a microphone and a voice recognition engine in the form of additional hardware and/or software. As a result, device cost and design time are increased. Still further design time and costs are incurred if voice prompting is included (e.g., "Say phone number").

DETAILED DESCRIPTION

In general, the example methods and apparatus described herein are used to control an electronic device connected to a network. The methods and apparatus convert text based device capabilities (i.e., functions) and/or a text based device list into one or more text based voice prompt scripts. The voice prompt scripts are then read to a user via a text-to-speech engine. The user responds with a voice command for a device. The voice command is converted into text by a voice recognition engine. This text is then used to send a command to the electronic device via the network.

Figure 1:
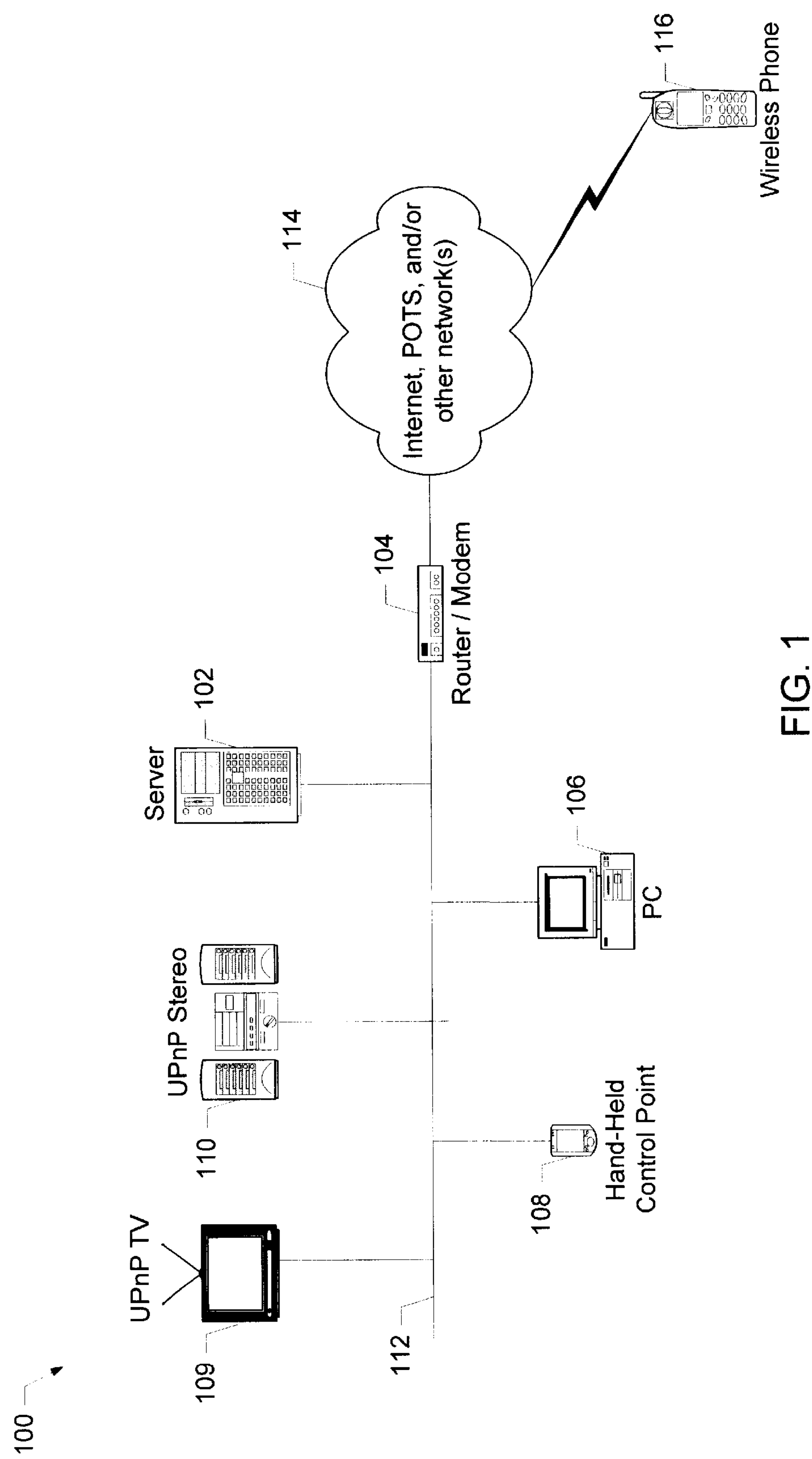
FIG. 1 is a block diagram of an example network environment.

A block diagram of an example network environment is illustrated in FIG. 1. The illustrated environment 100 includes a server 102, a router/modem 104, a personal computer (PC) 106, a hand-held device 108, a Universal Plug and Play (UPnP) enabled television 109, and a Universal Plug and Play enabled stereo 110. Of course, one or more of these devices may be combined into a single device. For example, the server 102, the personal computer 106, and/or the router/modem 104 may be combined into a single unit. Each of these devices is connected to each other via a local area network (LAN) 112. The local area network 112 allows the devices to communicate with each other and may be wired and/or wireless. In addition, the LAN 112 may be connected to a wide area network (WAN) 114. For example, the LAN 112 may be connected to the Internet via the router/modem 104, or the LAN 112 may be connected to the "plain old telephone system" (POTS) via the router/modem 104. This connection allows external devices, such as a wireless telephone 116 (or any other voice input/output device), to communicate with the LAN devices.

In order to facilitate communication between the LAN devices and/or any WAN devices, each of the devices is structured to communicate using a common protocol. For example, each of the devices may use the Universal Plug and Play (UPnP) protocol. The Universal Plug and Play protocol is a standard protocol that uses Internet and Web protocols to enable devices to be plugged into a network and automatically know about each other. When a UPnP device is connected to a network, the device automatically acquires a Transport Control Protocol/Internet Protocol (TCP/IP) address and notifies other devices connected to the network of its presence using a discovery protocol such as a discovery protocol based on Hypertext Transfer Protocol (HTTP).

UPnP devices may discover the capabilities of other UPnP devices connected to the same network by transmitting a capabilities query and receiving a capabilities response. For example, a digital camera connected to a network may discover a printer connected to the same network. In this manner, the camera may issue a print command to a printer that the camera was not specifically programmed to control. Similarly, another device may issue a photo retrieve command to the digital camera. Any electronic device or appliance may be UPnP enabled. For example, a UPnP stereo and/or a UPnP television may accept playback commands, volume commands, record commands, tuning commands, etc. from other UPnP devices.

The capabilities response may be a text based response. For example, the camera and the printer may use Extensible Markup Language (XML) and Universal Resource Locators (URLs) to talk to each other. Of course, many other protocols may be used. For example, simple object access protocol (SOAP), speech application language tags (SALT), speech application programming interface (SAPI), web service description language (WSDL), and/or voice extensible markup language (Voice XML) may be used.

The server 102, the PC 106, and the hand-held device 108 are also UPnP enabled. Each of these devices may act as a control point for other UPnP devices connected to the LAN 112. A control point is a device which issues commands to another device. These commands may be text based (e.g., XML). For example, the hand-held device 108 may issue a "volume up" command to the UPnP enabled television 109 and/or stereo 110. Other devices may also act as a control point to devices on the LAN 112 via the Internet 114 and the router 104. For example, the wireless telephone 116 may issue an "off" command to the UPnP enabled television 109 and/or stereo 110.

Figure 2:
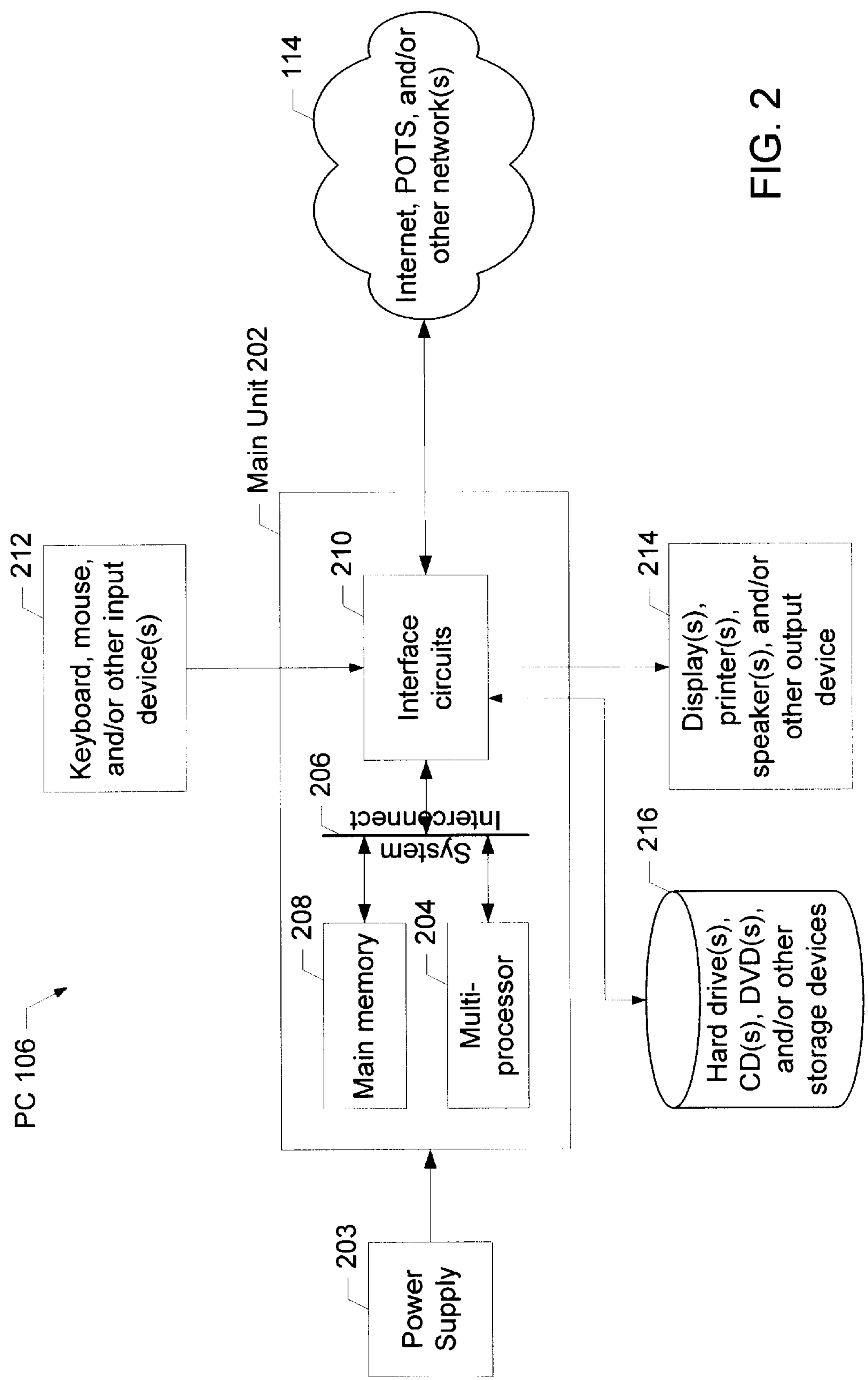
FIG. 2 is a block diagram of an example computer system.

A more detailed block diagram of an example computer system 106 is illustrated in FIG. 2. The computer system 106 may be a personal computer (PC), a personal digital assistant (PDA), an Internet appliance, a cellular telephone, or any other computing device. In an example, the computer system 106 includes a main unit 202 powered by a power supply 203. The main unit 202 may include a processor 204 coupled by a system interconnect 206 to a main memory device 208 and one or more interface circuits 210. In an example, the system interconnect 206 is an address/data bus. Of course, a person of ordinary skill in the art will readily appreciate that interconnects other than busses may be used to connect the processor 204 to the main memory device 208. For example, one or more dedicated lines and/or a crossbar may be used to connect the processor 204 to the main memory device 208.

The processor 204 may be a simultaneous multi-threading (SMT) processor and/or may include any number of processing agents and/or processor resources. For example, the processor 204 may include an integer execution unit, a floating-point unit, a single instruction multiple data (SIMD) unit, etc. The processor 204 may include any type of well known processing unit, such as a microprocessor from the Intel Pentium® family of microprocessors, the Intel Itanium® family of microprocessors, and/or the Intel XScale® family of processors. The processor 204 may also include any type of well known cache memory, such as static random access memory (SRAM). The main memory device 208 may include dynamic random access memory (DRAM) and/or any other form of random access memory. For example, the main memory device 208 may include double data rate random access memory (DDRAM). The main memory device 208 may also include non-volatile memory such as FLASH memory. In an example, the main memory device 208 stores a software program which is executed by the processor 204 in a well known manner.

The interface circuit(s) 210 may be implemented using any type of well known interface standard, such as an Ethernet interface and/or a Universal Serial Bus (USB) interface. One or more input devices 212 may be connected to the interface circuits 210 for entering data and commands into the main unit 202. For example, an input device 212 may be a keyboard, mouse, touch screen, track pad, track ball, isopoint, and/or a voice recognition system.

One or more displays, printers, speakers, and/or other output devices 214 may also be connected to the main unit 202 via one or more of the interface circuits 210. The display 214 may be cathode ray tube (CRTs), liquid crystal displays (LCDs), or any other type of display. The display 214 may generate visual indications of data generated during operation of the main unit 202. The visual displays may include prompts for human operator input, calculated values, detected data, etc.

The computer system 106 may also include one or more storage devices 216. For example, the computer system 106 may include one or more hard drives, a compact disk (CD) drive, a digital versatile disk drive (DVD), and/or other computer media input/output (I/O) devices.

The computer system 106 may also exchange data with other devices via a connection to the network 114. The network connection may be any type of network connection, such as an Ethernet connection, digital subscriber line (DSL), telephone line, coaxial cable, etc. The network 114 may be any type of network, such as the Internet, a telephone network, a cable network, and/or a wireless network.

The server 102 and/or the PC 106 also include a voice recognition engine and a text-to-speech engine. The voice recognition engine converts human words to text and/or other computer readable data. The text-to-speech engine converts text to human cognizable words. Using the text-to-speech engine, a text based capability response may be conveyed to a human user. Using the voice recognition engine, the user may give commands to a device.

Figure 3:
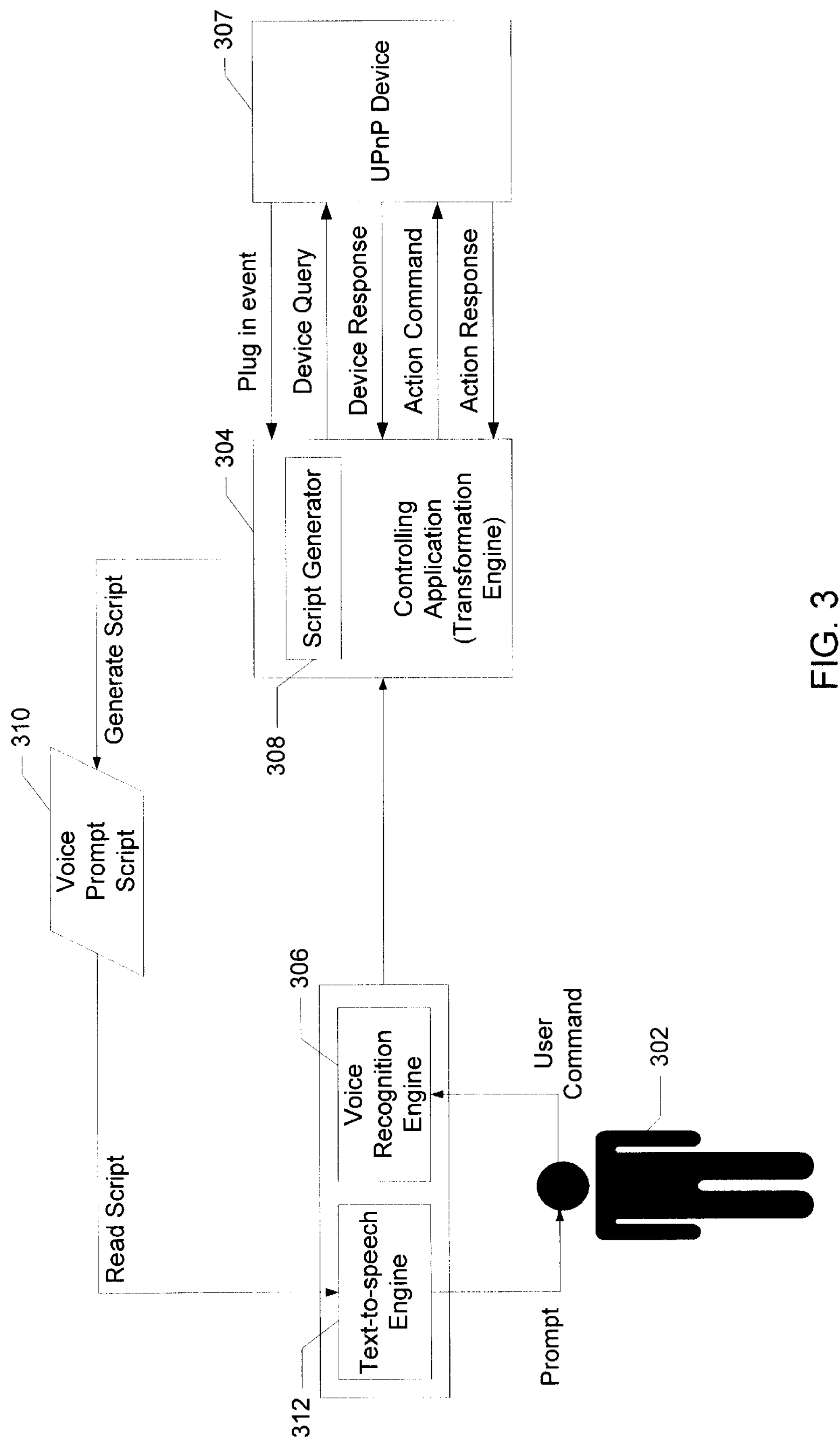
FIG. 3 is a block diagram of an example control scenario.

A flow diagram of a user acting as a control point to a Universal Plug and Play device is illustrated in FIG. 3. In a typical scenario, the user 302 issues a capabilities request to a controlling application 304. In one example, the capabilities request is initiated by a voice command via a voice recognition engine 306. The voice recognition engine 306 may be located in any device (e.g., PC 106, server 102, and/or wireless phone 116). In another example, the capabilities request is initiated when the user 302 presses a button (e.g., a virtual button on the hand-held device 108). In yet another example, the act of plugging in a UPnP device 307 (e.g., the television 109 or the stereo 110 of FIG. 1) may act as an initiator of the capabilities request.

In response to the user requesting a list of capabilities and/or in response to the detection of a UPnP device being plugged in to the network 112 and/or some other event, the controlling application 304 transmits a UPnP device capabilities query to the UPnP device 307. The UPnP device 307 responds to the controlling application 304 with a UPnP capabilities response. This capabilities response includes text representations of commands the UPnP device 307 is capable of accepting. For example, if the UPnP device is the UPnP stereo 110 of FIG. 1, the capabilities response may include such commands as "Power On" and "Set Volume." In addition, the capabilities response (or some other message from the device 307) may include a device name (e.g., "Sony stereo").

The text of the capabilities response is used by a script generator 308 to generate a voice prompt script 310. The script generator 308 may be part of the controlling application 304 and/or running on another UPnP device, such as the server 102 or the PC 106. The voice prompt script 310 includes text to be read to the user 302 by a text-to-speech engine 312. The text-to-speech engine 312 may be located in any device (e.g., PC 106, server 102, and/or wireless phone 116). The script generator 308 may used "canned" text to generate the voice prompt script 310. This canned text may be combined with the text included in the capabilities response from the UPnP device 307 to generate the voice prompt script 310. For example, the canned text may be, "To turn the ______ on, please say ______," and the text from the capabilities response may include "Sony stereo" for the device name and "Power On" for the power on command. As a result, the voice script may include, "To turn the Sony stereo on, please say Power On." In other words, a grammar table may be populated dynamically using data distributed on the network 112.

After one or more voice prompt scripts 310 are read to the user 302 via the text-to-speech engine 312, the user 302 sends a response to the controlling application 304 via the voice recognition engine 306. The user's response is then used by the controlling application 304 to generate a UPnP device action command. The UPnP device action command is then transmitted to the UPnP device 307.

The UPnP device 307 typically takes the action associated with the command and responds with an action response. For example, if the command is "volume up," the response may be "new volume level is seven." This response may be used to generate another voice script 310 and read to the user 302 in order to provide the user 302 with an audible acknowledgement that the action was taken, as well as additional information about the state of the UPnP device 307.

Figure 4:
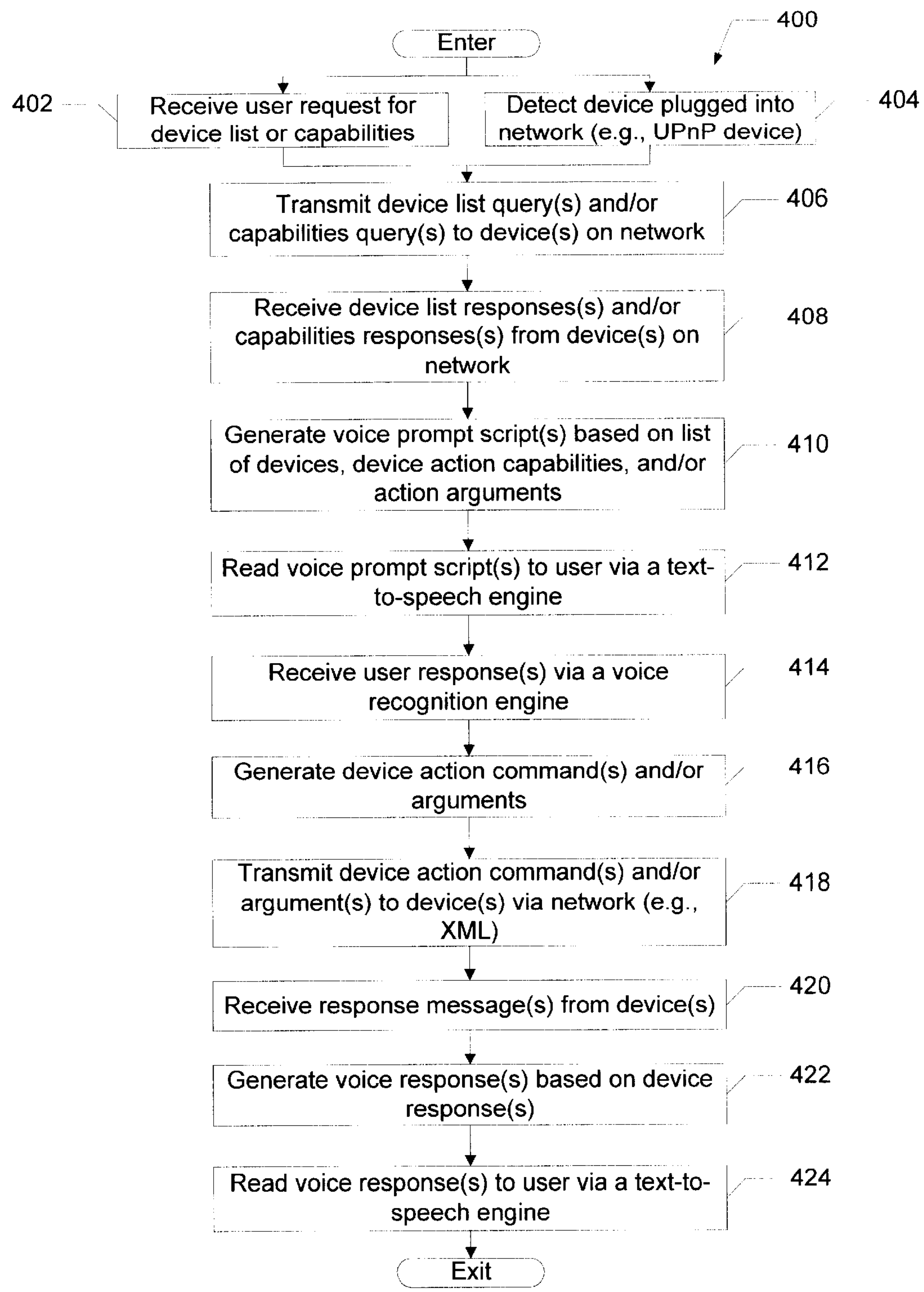
FIG. 4 is a flowchart of an example process for controlling an electronic device.

A detailed flowchart of a process 400 for controlling an electronic device is illustrated in FIG. 4. Preferably, the process 400 is embodied in a software program or a set of computer instructions which are stored in memory 208 and executed by the processor 204 in a well known manner. However, some or all of the blocks of the process 400 may be performed manually and/or by another device. Although the process 400 is described with reference to the flowchart illustrated in FIG. 4, a person of ordinary skill in the art will readily appreciate that many other methods of performing the process 400 may be used. For example, the order of many of the blocks may be changed, and/or the blocks themselves may be changed, combined and/or eliminated.

Generally, the process 400 causes the processor 204 to convert a text based device list and/or a text based function list into text based voice prompt scripts. The voice prompt scripts are then read to a user via a text-to-speech engine. The user responds with a voice command for a device. The voice command is converted into text by a voice recognition engine. This text is then used to send a command to the electronic device via the network.

The process 400 begins by causing the processor 204 to receive a user request for a list of devices and/or a list of device functions (block 402). The user request may be initiated by the user pressing a real button, pressing a virtual button, vocalizing a voice command to the voice recognition engine 306, and/or by any other method of issuing a command to a computer. Alternatively, the processor 204 may detect a device 307 being plugged into the network 112 (block 404). For example, the device 307 may send a signal to the processor 204 via the network 112, and/or the processor 204 may periodically poll the network 112 for newly connected devices.

Subsequently, the processor 204 transmits a query to the devices connected to the network 112 (block 406). For example, the query may be a query for a list of available devices and/or a query for the capabilities of one or more devices. In response, the processor 204 receives the requested device list and/or the request function list (block 408). For example, the device list may include names and network addresses for a networked television 109, a networked stereo 110, and/or any other networked device. In such an instance, the function list may include commands such as "volume up," volume down," "change channel," etc. Preferably, the capabilities are associated with one or more of the devices by name and/or network address.

The received device list(s) and/or function list(s) are then used to generate one or more voice prompt scripts 310 (block 410). For example, a voice prompt script 310 may list one or more devices for potential selection by the user 302. In another example, a voice prompt script 310 may list one or more device commands for potential selection by the user 302. The list of commands may be specific to a previously selected device. In yet another example, a voice prompt script 310 may prompt the user 302 for an argument associated with a command, such as a volume level for a volume command.

Once the voice prompt scripts 310 are generated, the voice prompt scripts 310 are read to the user 302 via the text-to-speech engine 312 (block 412). The user's response is then received via the voice recognition engine 306 (block 414). The user's response (or portions of the user's response) are used to generate a device action command (block 416). The device action command may include one or more command arguments. The device action command and/or the command arguments are then transmitted to the UPnP device 307 via the network 112 (block 418). In one example, Extensible Markup Language (XML) commands are transmitted to the UPnP device 307.

After the electronic device (e.g., the UPnP device 307) receives the device action command, the device responds with a message to the processor 204 (block 420). This response message may be used to generate a voice response (block 422), which is read to the user 302 via the text-to-speech engine 312 (block 424).

Figure 5:
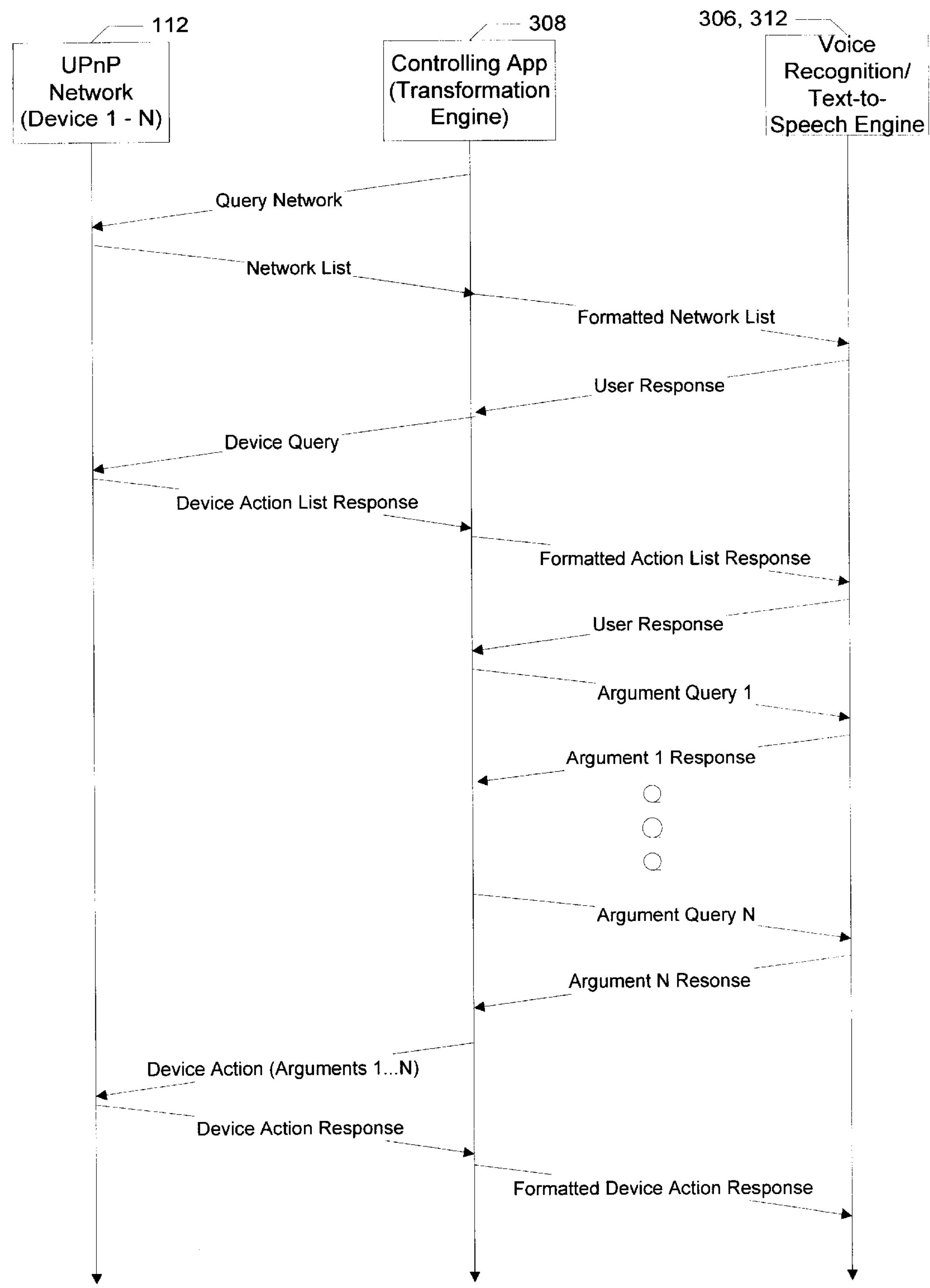
FIG. 5 is a ladder diagram of an example message flow for controlling an electronic device.

A ladder diagram of an example message flow for controlling an electronic device is illustrated in FIG. 5. The controlling application 308 queries the network 112 and receives a network list. The network list includes one or more devices connected to the network 112. The controlling application 308 then sends a formatted network list to the text-to-speech engine 312. The formatted network list includes additional text in order to present the network list in a more human friendly manner. The voice recognition engine 306 then provides the user's response.

The user's response is used to determine a device selection. The selected device is then sent a device query in order to determine the specific capabilities of the selected device. The selected device then responds with a device action list. The device action list is formatted (e.g., canned text is added), and the formatted action list is sent to the text-to speech engine 312. Again, the voice recognition engine 306 provides the user's response.

This time the user's response selects a device action (e.g., a device command) associated with the previously selected device. If necessary, the controlling application 308 then sends one or more argument queries to the text-to-speech engine 312 and receives corresponding argument responses from the voice recognition engine 306.

Once a device, a command, and any arguments are determined, the controlling application 308 sends a device action command to the device via the network 112. Subsequently, the device may respond with a device action response. In such an instance, the controlling application may send a formatted device action response to the text-to-speech engine 312.

In summary, persons of ordinary skill in the art will readily appreciate that methods and apparatus for controlling an electronic device have been provided. The foregoing description has been presented for the purposes of illustration and description. It is not intended to be exhaustive or to limit the scope of this patent to the examples disclosed. Many modifications and variations are possible in light of the above teachings. It is intended that the scope of this patent be defined by the claims appended hereto as reasonably interpreted literally and under the doctrine of equivalents.

What is claimed is:

1. A method of controlling an electronic device, the method comprising:

detecting the electronic device being plugged into a network;

transmitting a capabilities query to the electronic device in response to detecting the electronic device being plugged into the network;

receiving a capabilities response from the electronic device;

generating a voice prompt script based on the capabilities response;

reading the voice prompt script to a user via a text-to-speech engine;

receiving a user response via a voice recognition engine;

generating a device action command based on the user response; and transmitting the device action command to the electronic device.

2. A method as defined in claim 1, further comprising receiving a device response message from the electronic device in response to transmitting the device action command to the electronic device.

3. A method as defined in claim 1, further comprising receiving a device list.

4. A method as defined in claim 1, wherein receiving a user response comprises receiving at least one argument.

5. A method as defined in claim 1, wherein detecting the electronic device comprises detecting a Universal Plug and Play device being plugged into a network.

6. A method as defined in claim 5, wherein transmitting a capabilities query comprises transmitting a Universal Plug and Play device query and receiving a capabilities response comprises receiving a Universal Plug and Play response.

7. A method as defined in claim 6, further comprising receiving an argument list.

8. A method as defined in claim 1, wherein generating a voice prompt script comprises combining a canned voice script with at least a portion of the capabilities response from the electronic device.

9. A method as defined in claim 1, further comprising receiving a request from the user to read the voice prompt script, wherein reading the voice prompt script is in response to receiving the request from the user.

10. A method as defined in claim 9, wherein receiving a request from the user to read the voice prompt script comprises receiving data indicative of the user selecting a button.

11. A method as defined in claim 9, wherein receiving a request from the user to read the voice prompt script comprises receiving data indicative of a voice command to read the voice prompt script.

12. A method as defined in claim 1, wherein transmitting the device action command to the electronic device comprises transmitting a command described in Extensible Markup Language (XML) to an Internet Protocol (IP) address.

13. A method as defined in claim 1, wherein generating a device action command comprises generating a music playback command for a networked stereo based on the user response received via the voice recognition system.

14. A method as defined in claim 1, wherein generating a device action command comprises generating a channel change command for a networked television based on the user response received via the voice recognition system.

15. A method as defined in claim 1, wherein generating a device action command comprises generating a volume change command.

16. A method as defined in claim 1, wherein generating a device action command comprises generating a photo retrieve command for a networked digital camera based on the user response received via the voice recognition system.

17. A method as defined in claim 1, wherein generating a device action command comprises generating a print command for a networked printer based on the user response received via the voice recognition system.

18. A method as defined in claim 1, wherein receiving a user response comprises receiving a voice command via a wireless telephone.

19. A method as defined in claim 1, wherein receiving a user response comprises receiving a voice command via the Internet.

20. An apparatus to control an electronic device, the apparatus comprising:

a processor;

a network interface operatively coupled to the processor; and a memory device operatively coupled to the processor, the memory device storing instructions to cause the processor to:

transmit a capabilities query to the electronic device;

receive a capabilities response from the electronic device;

generate a voice prompt script based on the capabilities response;

read the voice prompt script to a user via a text-to-speech engine;

receive a user response via a voice recognition engine;

generate a device action command based on the user response; and transmit the device action command to the electronic device.

21. An apparatus as defined in claim 20, wherein the instructions are structured to cause the processor to detect the electronic device being plugged into a network.

22. An apparatus as defined in claim 21, wherein the instructions structured to cause the processor to transmit a capabilities query to the electronic device are further structured to cause the processor to transmit the capabilities query in response to detecting the electronic device being plugged into a network.

23. An apparatus as defined in claim 20, further comprising the electronic device.

24. An apparatus as defined in claim 23, wherein the electronic device comprises a Universal Plug and Play device.

25. An apparatus as defined in claim 20, wherein the instructions are structured to cause the processor to combine a canned voice script with at least a portion of the capabilities response to generate at least a portion of the voice prompt script.

26. An apparatus as defined in claim 20, wherein the instructions are structured to cause the processor to transmit an Extensible Markup Language (XML) command to an Internet Protocol (IP) address.

27. An apparatus as defined in claim 20, wherein the instructions cause the processor to generate at least one of (i) a music selection command for a networked stereo, (ii) a channel selection command for a networked television, and (iii) a photo selection command for a networked digital camera.

28. A machine readable medium storing instructions structured to cause a machine to:

detect the electronic device being plugged into a network;

transmit a capabilities query to the electronic device in response to detecting the electronic device being plugged into the network;

receive a capabilities response from the electronic device;

generate a voice prompt script based on the capabilities response;

read the voice prompt script to a user via a text-to-speech engine;

receive a user response via a voice recognition engine;

generate a device action command based on the user response; and transmit the device action command to the electronic device.

29. A machine readable medium as defined in claim 28, wherein the instructions are structured to cause the machine to combine a canned voice script with at least a portion of the capabilities response to generate at least a portion of the voice prompt script.

30. A machine readable medium as defined in claim 28, wherein the instructions are structured to cause the machine to transmit a command described in Extensible Markup Language (XML) to an Internet Protocol (IP) address.

* * * * *